United States Patent
Sugiyama et al.

(10) Patent No.: US 11,118,014 B2
(45) Date of Patent: Sep. 14, 2021

(54) POLYMER COMPOUND, INTERMEDIATE COMPOSITION, NEGATIVE ELECTRODE, ELECTRICITY STORAGE DEVICE, AND METHOD FOR PRODUCING POLYMER COMPOUND

(71) Applicant: KABUSHIKI KAISHA TOYOTA JIDOSHOKKI, Kariya (JP)

(72) Inventors: Yusuke Sugiyama, Kariya (JP); Takeshi Kondo, Kariya (JP); Takahiro Sugioka, Kariya (JP); Kohei Mase, Kariya (JP); Keigo Oyaizu, Kariya (JP)

(73) Assignee: KABUSHIKI KAISHA TOYOTA JIDOSHOKKI, Kariya (JP)

( * ) Notice: Subject to any disclaimer, the term of this patent is extended or adjusted under 35 U.S.C. 154(b) by 253 days.

(21) Appl. No.: 16/339,188

(22) PCT Filed: Aug. 29, 2017

(86) PCT No.: PCT/JP2017/030852
§ 371 (c)(1),
(2) Date: Apr. 3, 2019

(87) PCT Pub. No.: WO2018/066268
PCT Pub. Date: Apr. 12, 2018

(65) Prior Publication Data
US 2019/0315924 A1 Oct. 17, 2019

(30) Foreign Application Priority Data
Oct. 6, 2016 (JP) .............................. JP2016-198270

(51) Int. Cl.
| C08G 73/14 | (2006.01) |
| C08F 212/08 | (2006.01) |
| C08K 5/18 | (2006.01) |
| H01G 11/38 | (2013.01) |
| H01M 4/133 | (2010.01) |
| H01M 4/134 | (2010.01) |
| H01M 4/62 | (2006.01) |
| H01M 10/0525 | (2010.01) |
| H01M 4/02 | (2006.01) |

(52) U.S. Cl.
CPC ............ C08G 73/14 (2013.01); C08F 212/08 (2013.01); C08K 5/18 (2013.01); H01G 11/38 (2013.01); H01M 4/133 (2013.01); H01M 4/134 (2013.01); H01M 4/622 (2013.01); H01M 10/0525 (2013.01); H01M 2004/027 (2013.01)

(58) Field of Classification Search
CPC ......... C08K 5/18; C08G 73/14; C08F 212/08; C08F 212/00; H01G 11/38
See application file for complete search history.

(56) References Cited

U.S. PATENT DOCUMENTS

| 5,395,870 A * | 3/1995 | Suzuki .................... C08G 73/14 |
| | | 524/136 |
| 8,722,767 B2 * | 5/2014 | Mao ..................... H04W 52/267 |
| | | 523/435 |
| 2011/0183245 A1 * | 7/2011 | Wu ....................... G03G 5/0596 |
| | | 430/58.5 |
| 2019/0250511 A1 * | 8/2019 | Masuda .................. H01L 24/03 |

FOREIGN PATENT DOCUMENTS

| JP | 2012-230779 A | 11/2012 |
| JP | 2016-046151 A | 4/2016 |
| JP | 2016-170930 A | 9/2016 |

OTHER PUBLICATIONS

Machine translation of JP 2016-170930 (no date).*
Machine translation of JP 2015-046151 (no date).*

* cited by examiner

*Primary Examiner* — Amanda C. Walke
(74) *Attorney, Agent, or Firm* — Sughrue Mion, PLLC

(57) ABSTRACT

A polymer compound includes a first chain structure constituted by a polyamideimide and a second chain structure constituted by a vinyl polymer and bonded to terminals of the first chain structures and connecting the first chain structures together. The vinyl polymer constituting the second chain structure is a random copolymer including a bond-constituting unit having a side chain to be bonded to the first chain structure, and a non-bond-constituting unit having no side chain to be bonded to the first chain structure.

12 Claims, No Drawings

POLYMER COMPOUND, INTERMEDIATE COMPOSITION, NEGATIVE ELECTRODE, ELECTRICITY STORAGE DEVICE, AND METHOD FOR PRODUCING POLYMER COMPOUND

CROSS REFERENCE TO RELATED APPLICATIONS

This application is a National Stage of International Application No. PCT/JP2017/030852 filed Aug. 29, 2017, claiming priority based on Japanese Patent Application No. 2016-198270 filed Oct. 6, 2016.

TECHNICAL FIELD

The present invention relates to a polymer compound for use as a negative electrode binder of an electricity storage device, an intermediate composition of the polymer compound, a negative electrode, an electricity storage device, and a method for producing a polymer compound.

BACKGROUND ART

Many portable devices such as cell phones and laptop computers are utilized as a product using electricity storage devices such as rechargeable batteries. Electricity storage devices are attracting attention as a large power source for electric cars.

An electrode of a rechargeable battery is constituted, for example, of a current collector formed on a metallic material such as copper or aluminum, and an active material layer bonded on the current collector. The active material layer usually contains an electrode binder for bonding the active material to the current collector. For example, Patent Literature 1 discloses an electricity storage device using a polyamideimide as a negative electrode binder.

PRIOR ART DOCUMENT

Patent Document
Patent Document 1: Japanese Laid-Open Patent Publication No. 2012-230779

SUMMARY OF THE INVENTION

Problems that the Invention is to Solve

When a polyamideimide is used as a negative electrode binder, the initial efficiency of an electricity storage device is likely to be lower. The present researchers have found that, when a polymer compound obtained by making a specific modification on a polyamideimide is used as a negative electrode binder, the initial efficiency of an electricity storage device is improved. An object of the present invention is to provide a polymer compound useful as a negative electrode binder of an electricity storage device, an intermediate composition for obtaining the polymer compound, a negative electrode using the polymer compound as a negative electrode binder, an electricity storage device, and a method for producing the polymer compound.

Means for Solving the Problems

In accordance with a first aspect of the present invention, a polymer compound for use as a negative electrode binder of an electricity storage device is provided. The polymer compound includes a first chain structure constituted by a polyamideimide and a second chain structure constituted by a vinyl polymer and bonded to terminals of the first chain structures and connecting the first chain structures together. The vinyl polymer constituting the second chain structure is a random copolymer including a bond-constituting unit having a side chain to be bonded to the first chain structure and a non-bond-constituting unit having no side chain to be bonded to the first chain structure.

In the above-described polymer compound, the first chain structure and the second chain structure are bonded together through at least one of an amide bond and an imide bond.

In the above-described polymer compound, a bond structure between the first chain structure and the second chain structure is a bond structure represented by the following general formula (1), where PAI is the first chain structure; Poly is the second chain structure. X is a structure represented by the following general formula (2), where Y is a straight-chain alkyl group having 1 to 4 carbon atoms, a phenylene group, or an oxygen atom; and R1 and R2 are each independently a hydrogen atom, a methyl group, a trifluoromethyl group, or a methoxy group.

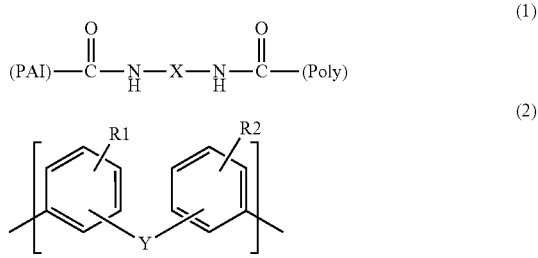

In accordance with a second aspect of the present invention, a polymer compound for use as a negative electrode binder of an electricity storage device is provided. The polymer compound is made by condensing a polyamideimide and a vinyl polymer. The vinyl polymer is a random copolymer including, as constitutional units, a vinyl monomer having a side chain capable of forming an amide bond or an imide bond between the vinyl polymer and an amino group or a carboxyl group, and a vinyl monomer forming no amide bond nor imide bond between the vinyl polymer and an amino group or a carboxyl group.

In accordance with a third aspect of the present invention, a polymer compound for use as a negative electrode binder of an electricity storage device is provided. The polymer compound is made by condensing a polyamideimide, a vinyl polymer, and a polyfunctional amine. The vinyl polymer is a random copolymer including, as constitutional units, a vinyl monomer having a side chain capable of forming an amide bond or an imide bond between the vinyl polymer and an amino group or a carboxyl group, and a vinyl monomer forming no amide bond nor imide bond between the vinyl polymer and an amino group or a carboxyl group.

In the above-described polymer compound, the polyfunctional amine is preferably an aromatic polyfunctional amine.

In the above-described the polymer compound, the polyfunctional amine is preferably an aromatic polyfunctional amine represented by the following general formula (3), where Y is a straight-chain alkyl group having 1 to 4 carbon atoms, a phenylene group, or an oxygen atom; and R1 and R2 are each independently a hydrogen atom, a methyl group, a trifluoromethyl group, or a methoxy group.

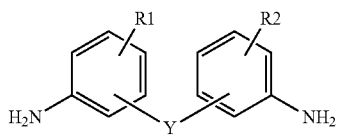

(3)

In accordance with a fourth aspect of the present invention, an intermediate composition of a polymer compound for use as a negative electrode binder of an electricity storage device is provided. The intermediate composition includes a polyamideimide, a vinyl polymer, and a solvent. The vinyl polymer is a random copolymer including, as constitutional units, a vinyl monomer having a side chain capable of forming an amide bond or an imide bond between the vinyl polymer and an amino group or a carboxyl group, and a vinyl monomer forming no amide bond nor imide bond between the vinyl polymer and an amino group or a carboxyl group.

In accordance with a fifth aspect of the present invention, a method for producing a polymer compound for use as a negative electrode binder of an electricity storage device is provided. The method includes condensing a polyamideimide and a vinyl polymer. The vinyl polymer is a random copolymer including, as constitutional units, a vinyl monomer having a side chain capable of forming an amide bond or an imide bond between the vinyl polymer and an amino group or a carboxyl group, and a vinyl monomer forming no amide bond nor imide bond between the vinyl polymer and an amino group or a carboxyl group.

In accordance with a sixth aspect of the present invention, a method for producing a polymer compound for use as a negative electrode binder of an electricity storage device is provided. The method includes condensing a polyamideimide, a vinyl polymer, and a polyfunctional amine. The vinyl polymer is a random copolymer including, as constitutional units, a vinyl monomer having a side chain capable of forming an amide bond or an imide bond between the vinyl polymer and an amino group or a carboxyl group, and a vinyl monomer forming no amide bond nor imide bond between the vinyl polymer and an amino group or a carboxyl group.

In accordance with a seventh aspect of the present invention, a negative electrode of an electricity storage device is provided that includes a negative electrode binder including the above-described polymer compound and a negative electrode active material. The negative electrode active material is at least one selected from carbon-based materials capable of occluding and releasing lithium, elements alloyable with lithium, and compounds having an element alloyable with lithium.

In the above-described negative electrode, the negative electrode active material is at least one selected from silicon materials obtained from $CaSi_2$ through a calcium removal reaction, Si and $SiO_V$ ($0<V\leq2$).

In accordance with an eighth aspect of the present invention, an electricity storage device is provided that includes the above-described negative electrode and a nonaqueous electrolyte.

Effects of the Invention

The present invention improves the initial efficiency of an electricity storage device.

MODES FOR CARRYING OUT THE INVENTION

Embodiments of the present invention will be described in detail below.

[Polymer Compound] A polymer compound of the present embodiment comprises a first chain structure, and a second chain structure bonded to terminals of the first chain structures and connecting the first chain structures.

First Chain Structure

The first chain structure is constituted by a polyamideimide. The polyamideimide constituting the first chain structure is a polymer having a structure represented by the general formula (4) as a constitutional unit.

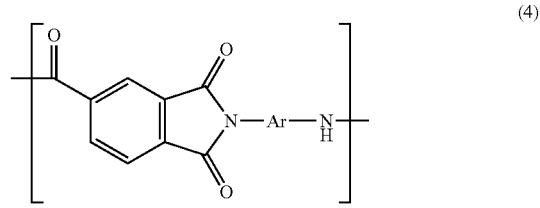

(4)

In the general formula (4), Ar is a structure represented by the general formula (5) or the general formula (6).

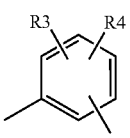

(5)

In the general formula (5), R3 and R4 are each independently a single or a plurality of hydrogen atoms, a methyl group or an ethyl group.

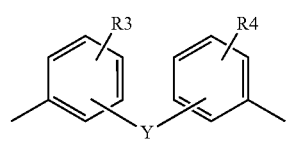

(6)

In the general formula (6), R3 and R4 are each independently a single or a plurality of hydrogen atoms, a methyl group or an ethyl group. Z is a structure represented by —O—, —S—, —C(=O)—, —SO$_2$—, —C(=O)O—, —(CH$_2$)$_n$—, —C(CF$_3$)$_2$— or —C(CH$_3$)$_2$—. The letter n of —(CH$_2$)$_n$— is an integer of 0 or more and 5 or less.

The polyamideimide constituting the first chain structure may also be a silane-modified polyamideimide containing an alkoxysilyl group. Examples of the alkoxysilyl group include monoalkoxysilyl groups having an alkoxy group such as a methoxy group, an ethoxy group or a propoxy group, dialkoxysilyl groups, and trialkoxysilyl groups. Among these, dialkoxysilyl groups and trialkoxysilyl groups are especially preferable.

The position of an alkoxysilyl group in the silane-modified polyamideimide is not especially limited, and may be a position in the polyamideimide chain or a terminal thereof, or a position in a side chain thereof. A silane-modified polyamideimide having an alkoxysilyl group in the polyamideimide chain is disclosed, for example, in Japanese Laid-Open Patent Publication No. 2001-68115. A silane-modified polyamideimide having an alkoxysilyl group on a polyamideimide chain terminal is disclosed, for example, in Japanese Laid-Open Patent Publication No. 2009-043678.

Examples of the silane-modified polyamideimide having an alkoxysilyl group on a side chain of the polyamideimide include silane-modified polyamideimides, as represented by the general formula (7), in which a functional group containing an alkoxysilyl group is bonded as a side chain to an amino group (secondary amine) having a structure represented by the general formula (4).

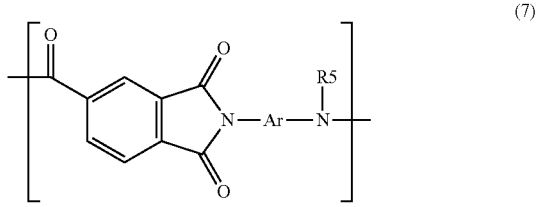

(7)

In the general formula (7), Ar is a structure represented by the general formula (5) or the general formula (6); and R5 is a functional group containing an alkoxysilyl group.

The functional group containing an alkoxysilyl group includes functional groups formed by reaction of a polyamideimide with an alkoxysilyl group-containing compound. Examples of the alkoxysilyl group-containing compound include isocyanate group-containing alkoxysilanes such as 3-(trimethoxysilyl)propyl isocyanate and 3-(triethoxysilyl)propyl isocyanate, and epoxy group-containing alkoxysilanes such as 3-glycidylpropyltrimethoxysilane.

The silane-modified polyamideimide constituting the first chain structure may be a polymer having only a structure represented by the general formula (7) as a constitutional unit, or may also be a polymer having both of a structure represented by the general formula (4) and a structure represented by the general formula (7) as constitutional units. The degree of modification of the silane-modified polyamideimide, that is, the ratio (a constitutional unit of a structure represented by the general formula (4):a constitutional unit of a structure represented by the general formula (7)) of a constitutional unit of a structure represented by the general formula (4) to a constitutional unit of a structure represented by the general formula (7) is preferably in the range of 99:1 to 80:20 and more preferably in the range of 98:2 to 89:11.

The weight-average molecular weight of the polyamideimide constituting the first chain structure is not especially limited, and is, for example, preferably in the range of 1,000 to 100,000 and more preferably in the range of 5,000 to 50,000.

Most terminals of the first chain structures are connected to the second chain structures. Specifically, the terminals of the first chain structures are bonded preferably in 50% or more, more preferably in 75% or more, and still more preferably in 95% or more to the second chain structures.

Second Chain Structure

The second chain structure is constituted by a vinyl polymer. The vinyl polymer constituting the second chain structure is a random copolymer comprising a bond-constituting unit having a side chain to be bonded to the first chain structure and a non-bond-constituting unit having no side chain to be bonded to the first chain structure. With respect to the constituting proportion of the bond-constituting unit and the non-bond-constituting unit in the vinyl polymer, it is preferable that the ratio of the non-bond-constituting unit be higher than that of the bond-constituting unit. It is preferable that the ratio (the bond-constituting unit:the non-bond-constituting unit) of the bond-constituting unit to the non-bond-constituting unit be, for example, in the range of 1:1 to 1:10.

The bond-constituting unit is, for example, a constitutional unit composed of a vinyl monomer (hereinafter, referred to as bonding monomer) having a side chain which can form a bond structure such as an amide bond or an imide bond between the bond-constituting unit and an amino group or a carboxyl group. The bonding monomer includes vinyl monomers having a reactivity with an amino group and vinyl monomers having a reactivity with a carboxyl group. Examples of the vinyl monomers having a reactivity with an amino group include vinyl monomers having a carboxyl group such as acrylic acid, methacrylic acid, maleic acid, maleic anhydride and phthalic acid, and vinyl phosphate, vinyl sulfonate, and acrolein (2-propenal). The vinyl monomers having a reactivity with a carboxyl group includes vinyl monomers having an amino group such as vinylaniline and vinylimidazole. The vinyl polymer may have a structure having only one bonding monomer among these bonding monomers as the bond-constituting unit, or may have a structure having two or more thereof as the bond-constituting units.

The non-bond-constituting unit is, for example, a constitutional unit composed of a vinyl monomer (hereinafter, referred to as non-bonding monomer) which forms no bond structure such as an amide bond or an imide bond between the non-bond-constituting unit and an amino group or a carboxyl group. Examples of the non-bonding monomer include styrene, ethylene, isobutane, butadiene, isoprene, acrylonitrile, methacrylonitrile, vinyl acetate, methyl vinyl ketone, N,N-dimethylacrylamide, butyl alkyl ethers, vinyl chloride, hydroxyethyl acrylate, N-[3-(dimethylamino)propyl]acrylamide, and N-isopropylacrylamide.

It is preferable that the non-bonding monomer be a non-bonding monomer having a side chain becoming a steric hindrance. Examples of the non-bonding monomer having a side chain becoming a steric hindrance include styrene, 2-methylstyrene, 3-methylstyrene, 4-methylstyrene, 2,4,6-trimethylstyrene, sodium styrenesulfonate, vinylpyridine, 2-vinylnaphthalene, stilbene, 3,3-dimethyl-1-butene, (+)-camphene, and (−)-camphene.

The vinyl polymer may have a structure having only one non-bonding monomer among these non-bonding monomers as the non-bond-constituting unit, or may have a structure having two or more thereof as the non-bond-constituting units.

The weight-average molecular weight of the vinyl polymer constituting the second chain structure is not especially limited, and is, for example, preferably in the range of 5,000 to 2,000,000 and more preferably in the range of 8,000 to 200,000.

In the polymer compound, the second chain structure is contained so that most terminals of the first chain structure are bonded to the second chain structures. Therefore, the ratio of the second chain structure to the first chain structure is established according to the number of the first chain structure and the ratio of the bonding monomer in the second chain structure.

Bond Structure

The first chain structure and the second chain structure are mutually bonded through formation of a bond structure containing at least one of an amide bond and an imide bond between the terminals of the first chain structures and moieties composed of the bond-constituting units in the second chain structure.

Examples of the bond structure include a bond structure in which the terminals of the first chain structures and moieties composed of the bond-constituting units in the second chain structure are directly bonded, and a bond structure in which specific structures are made to intervene between the terminals of the first chain structures and the moieties composed of the bond-constituting units in the second chain structure.

Examples of the bond structure in which the specific structure is made to intervene include bond structures represented by the following general formula (1).

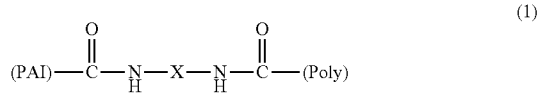

(1)

In the general formula (1), PAI is the first chain structure; Poly is the second chain structure; and X is a straight-chain alkyl group having 1 to 10 carbon atoms or an aromatic ring structure.

Examples of the aromatic ring structure include aromatic ring structures represented by the following general formula (2).

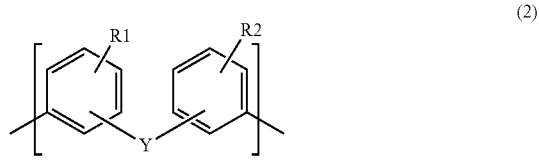

(2)

In the general formula (2), Y is a straight-chain alkyl group having 1 to 4 carbon atoms, a phenylene group, or an oxygen atom; and the bonding position of Y in each benzene ring may be any of the ortho position, the meta position and the para position to the amino group.

When Y is a straight-chain alkyl group or a phenylene group, a substituent may be bonded to a carbon atom constituting the structure. Examples of the substituent bonded to a carbon atom constituting the straight-chain alkyl group include a methyl group, an ethyl group, a fluoromethyl group, a difluoromethyl group, a trifluoromethyl group, a methoxy group, and an ethoxy group. These substituents may be bonded in only one kind or may be bonded in two or more kinds. Further the number of the substituent bonded to one carbon atom may be one or may also be two. The substituent bonded to a carbon atom constituting a straight-chain alkyl group and a phenylene group may be an amino group or a substituent containing an amino group.

In the general formula (2), R1 and R2 are each independently a hydrogen atom, a methyl group, a trifluoromethyl group, or a methoxy group; when R1 is a methyl group, a trifluoromethyl group, or a methoxy group, the bonding position of R1 may be any of the ortho position, the meta position, and the para position to the amino group. Also with respect to R2, the same is applied.

The polymer compound may have only one of the above bond structures or may have two or more thereof. [Method for Producing Polymer Compound] Then, one example of a method for producing the polymer compound will be described.

The polymer compound is obtained by condensing a polyamideimide, a vinyl polymer, and as required, a polyfunctional amine. Specifically, the polymer compound is obtained by being subjected to a mixing step of mixing a polyamideimide, a vinyl polymer, and as required, a polyfunctional amine, and a heating step of subjecting an intermediate composition obtained in the mixing step to a heat treatment.

Polyamideimide

The polyamideimide is a polyamideimide having a structure represented by the above general formula (4) as a constitutional unit. The weight-average molecular weight of the polyamideimide is not especially limited, but is, for example, preferably in the range of 1,000 to 100,000 and more preferably in the range of 5,000 to 50,000.

Vinyl Polymer

The vinyl polymer is a random copolymer having, as constitutional units, a vinyl monomer having a side chain which can form an amide bond or an imide bond between the vinyl polymer and an amino group or a carboxyl group, and a vinyl monomer forming no amide bond nor an imide bond between the vinyl polymer and an amino group or a carboxyl group. The former is the above bonding monomer, and the latter is the above non-bonding monomer. The weight-average molecular weight of the vinyl polymer is not especially limited, but is, for example, preferably in the range of 5,000 to 2,000,000 and more preferably in the range of 8,000 to 200,000.

It is preferable that the blend proportion of the vinyl polymer be, with respect to 100 parts by mass of the polyamideimide, established in the range of 0.1 to 30 parts by mass. It is preferable that the blend proportion be established so that the number of moieties composed of the bonding monomers contained in the vinyl polymer is equal to or larger than the number of the polyamideimide (the number of a terminal of the polyamideimide). Specifically, the molar ratio (the number of the polyamideimide:the number of the moieties composed of the bonding monomers contained in the vinyl polymer) of the number of the polyamideimide to the number of the moieties composed of the bonding monomers contained in the vinyl polymer is preferably in the range of 1:1 to 1:10 and more preferably 1:1 to 1:2.

Polyfunctional Amine

The polyfunctional amine is blended when a bond structure is to be formed between a carboxyl group of a terminal of the polyamideimide and a carboxyl group the vinyl polymer has. The polyfunctional amine is not especially limited, but it is preferable, from the viewpoint of dissolvability in production, that the polyfunctional amine be an aromatic polyfunctional amine having an aromatic ring structure such as a benzene ring in the molecular structure. Examples of the aromatic polyfunctional amine include compounds having a structure represented by the following general formula (3).

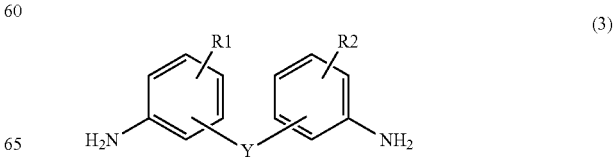

(3)

In the general formula (3), Y is a straight-chain alkyl group having 1 to 4 carbon atoms, a phenylene group or an oxygen atom; and the bonding position of Y in each benzene ring may be any of the ortho position, the meta position, and the para position to the amino group.

When Y is a straight-chain alkyl group or a phenylene group, a substituent may be bonded to a carbon atom constituting the structure. Examples of the substituent bonded to a carbon atom constituting the straight-chain alkyl group include a methyl group, an ethyl group, a fluoromethyl group, a difluoromethyl group, a trifluoromethyl group, a methoxy group, and an ethoxy group. These substituents may be bonded in only one kind or may be bonded in two or more kinds. The number of the substituent bonded to one carbon atom may be one or may also be two. The substituent bonded to a carbon atom constituting a straight-chain alkyl group and a phenylene group may be an amino group or a substituent containing an amino group, and in this case, the polyfunctional amine has 3 or more amino groups.

In the general formula (3), R1 and R2 are each independently a hydrogen atom, a methyl group, a trifluoromethyl group or a methoxy group; when R1 is a methyl group, a trifluoromethyl group or a methoxy group, the bonding position of R1 may be any of the ortho position, the meta position, and the para position to the amino group. Also with respect to R2, the same is applied.

Specific examples of compounds having a structure represented by the general formula (3) will be described.

Examples of the polyfunctional amine in which Y is a straight-chain alkyl group include 3,3'-diaminodiphenylmethane, 4,4'-diaminodiphenylmethane, 3,4'-diaminodiphenylmethane, 4,4'-ethylenedianiline, 4,4'-diamino-3,3'-dimethyldiphenylmethane, 1,1-bis(4-aminophenyl)cyclohexane, 9,9-bis(4-aminophenyl)fluorene, and 2,2'-bis(4-aminophenyl)hexafluoropropane. Examples of the polyfunctional amine in which Y is a phenylene group include 1,3,5-tris(4-aminophenyl)benzene. 1,3,5-tris(4-aminophenyl)benzene is a trifunctional amine having three amino groups. Examples of the polyfunctional amine in which Y is an oxygen atom include 4,4'-diaminodiphenyl ether.

Examples of aromatic polyfunctional amines other than the compounds having a structure represented by the general formula (3) include 1,2-diaminobenzene, 1,3-diaminobenzene, 1,4-diaminobenzene, 2,4-diaminotoluene, 2,5-diaminotoluene, 3,4-diaminotoluene, 3,4-diaminobenzoic acid, 3,5-diaminobenzoic acid, 1,5-diaminonaphthalene, 1,8-diaminonaphthalene, 2,4-diaminopyridine, 2,5-diaminopyridine, 2,6-diaminopyridine, and 1,3-diiminoisoindoline.

Examples of other polyfunctional amines other than aromatic polyfunctional amines include 1,4-diaminobutane, 1,6-diaminohexane, and 1,8-diaminooctane. The polyfunctional amines may be used singly or concurrently in two or more.

It is preferable that the blend proportion of the polyfunctional amine be that enough to form bond structures between all carboxyl groups of terminals of the polyamideimide and carboxyl groups the vinyl polymer has. When the number of carboxyl groups the vinyl polymer has is excessive to the number of carboxyl groups of terminals of the polyamideimide, with the aim of bonding with and capping excess carboxyl groups, the polyfunctional amine exceeding an amount necessary for forming the bond structures is allowed to be blended.

Mixing Step

The mixing step is a step of mixing the polyamideimide, the vinyl polymer, and as required, the polyfunctional amine, and a solvent to thereby obtain a liquid intermediate composition. The solvent used in the mixing step can suitably be selected from solvents which dissolve the polyamideimide, the vinyl polymer, and as required, the polyfunctional amine. In particular, for improving the dissolvability, it is preferable to use a nonaqueous solvent such as N-methyl-2-pyrrolidone, dimethylformamide, dimethylacetamide, dimethyl sulfoxide, propylene carbonate, γ-butyrolactone, ethanol, or propanol.

Heating Step

The heating step is a step of subjecting the intermediate composition to a heat treatment to condense the polyamideimide, the vinyl polymer, and as required, the polyfunctional amine contained in the intermediate composition to thereby form bond structures. It is preferable, from the viewpoint of promoting the formation of the bond structures, that the heating temperature in the heating step be in the range of 150 to 230° C.

Then in order to promote the formation of the bond structures by the condensation reaction, a dehydrating condensing agent may be added to the intermediate composition. The dehydrating condensing agent includes phosphorus oxychloride.

It is preferable that the intermediate composition to be supplied to the heating step be an intermediate composition having been subjected to a pre-heat treatment. The temperature of the pre-heat treatment is preferably in the range of 40 to 140° C. and more preferably in the range of 60 to 130° C. The pre-heat treatment causes the polyamideimide, the vinyl polymer and as required, the polyfunctional amine contained in the intermediate composition to associate and makes easy the progress of the condensation reaction of the carboxyl groups with the amino groups. As a result, in the heating step, the condensation reaction progresses efficiently. By the pre-heat treatment, the condensation reaction of the carboxyl groups with the amino groups is allowed to partially progress. When the intermediate composition having been subjected to the pre-heat treatment is used, it is preferable that the heating step be carried out in the state that the solvent contained in the intermediate composition has been removed. In this case, it becomes easy for the condensation reaction of the carboxyl groups with the amino groups to progress. Then, by making the intermediate composition to be subjected to the heating step, there is obtained the polymer compound having the first chain structure and the second chain structure.

In the case of using the silane-modified polyamideimide having a structure represented by the general formula (7) as at least a part of constitutional units of the first chain structure, in the mixing step, the above alkoxysilyl group-containing compound is mixed. In this case, it is preferable that after the liquid intermediate composition made by mixing the polyamideimide, the vinyl polymer and as required, the polyfunctional amine and the solvent be subjected to the pre-heat treatment, the above alkoxysilyl group-containing compound be added to the liquid intermediate composition and stirred at room temperature for several hours.

[Negative Electrode]

Then, there will be described one example of a method for producing a negative electrode using the above polymer compound as a negative electrode binder.

First, a negative electrode active material, a negative electrode binder, and a solvent are mixed to thereby prepare a slurry. At this time, as required, other components such as a conductive aid may further be mixed. As the negative electrode active material, a well-known substance for use as a negative electrode active material of electricity storage devices such as rechargeable batteries can be used, such as a carbon-based material, an element alloyable with lithium, or a compound having an element alloyable with lithium.

As the carbon-based material, for example, a carbon-based material capable of occluding and releasing lithium can be used; and specific examples thereof include non-graphitizing carbon, natural graphite, artificial graphite, coke, graphite, glasslike carbon, baked organic polymer compounds, carbon fibers, active carbon, and carbon black.

Examples of the element alloyable with lithium include Na, K, Rb, Cs, Fr, Be, Mg, Ca, Sr, Ba, Ra, Ti, Ag, Zn, Cd, Al, Ga, In, Si, Ge, Sn, Pb, Sb, and Bi. Among these, Si is especially preferable.

Examples of the compound having an element alloyable with lithium include compounds having an element selected from Na, K, Rb, Cs, Fr, Be, Mg, Ca, Sr, Ba, Ra, Ti, Ag, Zn, Cd, Al, Ga, In, Si, Ge, Sn, Pb, Sb, and Bi. Among these, a silicon-based material being a compound having Si is especially preferable.

Examples of the silicon-based material include $SiB_4$, $SiB_6$, $Mg_2Si$, $Ni_2Si$, $TiSi_2$, $MoSi_2$, $CoSi_2$, $NiSi_2$, $CaSi_2$, $CrSi_2$, $Cu_5Si$, $FeSi_2$, $MnSi_2$, $NbSi_2$, $TaSi_2$, $VSi_2$, $WSi_2$, $ZnSi_2$, $SiC$, $Si_3N_4$, $Si_2N_2O$, $SiO_V$ ($0<V\le2$), $SnSiO_3$, and $LiSiO$. Among these, $SiO_V$ ($0<V\le2$) is especially preferable.

As the silicon-based material, there can also be used a silicon-based material disclosed in International Publication No. 2014/080608, that is, a silicon material obtained through a calcium removing reaction of $CaSi_2$. The silicon material can be obtained, for example, by subjecting a layer polysilane obtained by treating $CaSi_2$ with an acid (for example, hydrochloric acid or hydrogen fluoride) to calcium removal (for example, a heat treatment at 300 to 1,000° C.). It is especially preferable that the polymer compound of the present embodiment be used by being combined with the silicon-based material, which is a negative electrode active material having a high degree of expansion and contraction in the charge and discharge time. Among the above substances, only one kind thereof may be used or two or more thereof may be used concurrently as a negative electrode active material.

As the negative electrode binder to be mixed in the slurry, the above intermediate composition is used. Other negative electrode binders may be used concurrently as a negative electrode binder. Examples of the other negative electrode binders include polyvinylidene fluoride, polyethylene tetrafluoride, styrene-butadiene rubber, polyimide, polyamide-imide, carboxymethylcellulose, polyvinyl chloride, methacrylic resins, polyacrylonitrile, modified polyphenylene oxide, polyethylene oxide, polyethylene, polypropylene, polyacrylic acid, and phenol resins.

Among these other negative electrode binders, only one kind thereof may be used or two or more thereof may be used concurrently. When other negative electrode binders are concurrently used, the solid content of the intermediate composition is contained, with respect to the total solid content of negative electrode binders, preferably in 1% by mass or higher and more preferably in 10% by mass or higher.

The blend proportion (negative electrode active material: negative electrode binder) in mass ratio of the negative electrode active material to the negative electrode binder can suitably be established according to kinds of the negative electrode active material and the negative electrode binder. The blend proportion is, for example, preferably in the range of 5:3 to 99:1, more preferably in the range of 3:1 to 97:3, and still more preferably in the range of 16:3 to 95:5.

As the solvent, a well-known solvent used in fabrication of electrodes of electricity storage devices such as rechargeable batteries can be suitably used according to kinds of the negative electrode active material and the negative electrode binder. Specific examples of the solvent include N-methyl-2-pyrrolidone, methanol, and methyl isobutyl ketone.

As the conductive aid, a well-known conductive aid used for negative electrodes of electricity storage devices such as rechargeable batteries can be used. Specific examples of the conductive aid include acetylene black, carbon nanotubes, and Ketjen black(R). Among these conductive aids, only one kind thereof may be used or two or more thereof may be used concurrently.

When a conductive aid is incorporated in the slurry, it is preferable that a dispersant be contained together with the conductive aid. Specific examples of the dispersant include polyvinylpyrrolidone, polyvinyl alcohol, polyvinyl butyral, and triazine compounds. Among these dispersants, only one kind thereof may be used or two or more thereof may be used concurrently.

Then, the slurry is applied on a current collector to thereby form a negative electrode active material layer composed of the slurry on the surface of the current collector. Thereafter, the solvents (the solvent of the slurry and the solvent contained in the above intermediate composition) contained in the negative electrode active material layer are removed; and the negative electrode active material layer is dried and subjected to a heat treatment to cure the negative electrode active material layer. The heat treatment condenses the polyamideimide, the vinyl polymer and as required, the polyfunctional amine contained in the above intermediate composition to thereby form the polymer compound in the negative electrode active material layer. Although the heat treatment can be carried out in the state that the negative electrode active material layer contains the solvents, it is more preferable that a drying treatment be first carried out and then the heat treatment be carried out in the state that the negative electrode active material has been dried.

Examples of specific methods of the drying treatment and the heat treatment include heating methods using a heat source such as hot air, infrared rays, microwaves or high-frequency waves under normal pressure or reduced pressure. When the heat treatment is carried out, it is preferable that the heat treatment carry out heating from the current collector side rather than from the negative electrode active material layer side. It is preferable that the drying treatment carry out slow heating at a low temperature rather than quick heating at a high temperature, and it is preferable that the heat treatment carry out quick heating at a high temperature rather than slow heating at a low temperature. Thereby, battery characteristics (initial efficiency and cyclability) of an electricity storage device can be enhanced.

As the current collector, a well-known metallic material for use as a negative electrode current collector of electricity storage devices such as rechargeable batteries can be used. Examples of the metallic material utilizable as the current collector include silver, copper, gold, aluminum, magnesium, tungsten, cobalt, zinc, nickel, iron, platinum, tin, indium, titanium, ruthenium, tantalum, molybdenum, and stainless steel.

The negative electrode using the polymer compound of the present embodiment as the negative electrode binder can suitably be used for nonaqueous electricity storage devices having a nonaqueous electrolyte as an electrolyte. Examples of the electricity storage devices include rechargeable batteries, electric double layer capacitors, and lithium ion capacitors. These electricity storage devices are useful as nonaqueous rechargeable batteries for driving motors of electric cars and hybrid cars, and as nonaqueous rechargeable batteries to be utilized for personal computers, portable communication devices, household appliances, office devices, industrial devices, and the like.

The operation and advantages of the present embodiment will now be described.

(1) The polymer compound comprises a first chain structure constituted by a polyamideimide and a second chain structure constituted by a vinyl polymer and bonded to terminals of the first chain structures to connect the first chain structures. The vinyl polymer constituting the second chain structures is a random copolymer comprising a bond-constituting unit having a side chain to be bonded to the first chain structure and a non-bond-constituting unit having no side chain to be bonded to the first chain structure.

When the polyamideimide is used as the negative electrode binder, the initial efficiency of an electricity storage device is liable to lower. It is conceivable that this tendency is due to that aromatic ring moieties constituting the polyamideimide form a stack structure based on the n-n interaction. That is, in the initial charge and discharge time, lithium ions released from a positive electrode is fixed interlayerly in the stack structure the polyamideimide forms, and become kept idle. Consequently, the total amount of lithium ions migrating between electrodes reduces and the initial efficiency of the electricity storage device lowers.

The polymer compound of the present embodiment has a shape in which terminals of a plurality of the first chain structures are spacingly bonded to one second chain structure, for example, a structure like a ladder having the second chain structure as a longitudinal moiety and the first chain structure as a lateral moiety. In this structure, the second chain structure (in particular, moieties composed of the non-bonding unit) constituted by the vinyl polymer functions as spacers and approach of the first chain structures constituted by the polyamideimide is physically suppressed. Consequently, formation of the stack structure by the polyamideimide is suppressed and the lowering of the initial efficiency due to the stack structure of the polyamideimide is improved.

(2) In the vinyl polymer constituting the second chain structure, it is preferable that the ratio of the non-bond-constituting unit be higher than that of the bond-constituting unit. In this case, there become much the moieties composed of the non-bond-constituting unit functioning as spacers. Thereby, the proximity of the polyamideimides and the formation of the stack structure can effectively be suppressed.

(3) It is preferable that the non-bond-constituting unit constituting the vinyl polymer constituting the second chain structure be a non-bond-constituting unit having a side chain to become a steric hindrance. In this case, there is enhanced the function as spacers of moieties composed of the non-bonding monomer in the vinyl polymer. The proximity of the polyamideimides and the formation of the stack structure can effectively be suppressed.

(4) It is preferable that the first chain structure and the second chain structure be bonded through at least one of an amide bond and an imide bond. It is more preferable that the bond structure between the first chain structure and the second chain structure be a structure represented by the above general formula (1). It is still more preferable that X in the above general formula (1) be a structure represented by the above general formula (2). In this case, the effects described in the above (1) can be attained more securely.

(5) It is preferable that the polyamideimide constituting the first chain structure is the silane-modified polyamideimide containing an alkoxysilyl group. It is more preferable that at least part of the constitutional unit of the silane-modified polyamideimide be a structure represented by the above general formula (7).

When the polymer compound is used as the negative electrode binder, the addition of an inorganic structural moiety based on the alkoxysilyl group to the first chain structure improves adhesiveness of the negative electrode active material layer and improves the cyclability of a rechargeable battery. It is conceivable that these effects are effects based on the improvement of the strength of the resin due to that the polymer compound is composited with silica through the addition of the above inorganic structural moiety.

EXAMPLES

Hereinafter, examples of the above-described embodiment will be described.

Example 1

Synthesis of PAI

In an inert gas atmosphere, 10 g (52 mmol) of trimellitic anhydride, 10.3 g (52 mmol) of 4,4'-diaminodiphenylmethane and 213 mg (2.6 mmol) of 1-methylimidazole were dissolved in 115 g of N-methyl-2-pyrrolidone (hereinafter, described as NMP). Then, the mixture was heated and stirred in an inert atmosphere at 100° C. for 4 hours to thereby obtain a solution of a polyamideimide having a weight-average molecular weight of 15,000.

Synthesis of Vinyl Polymer 1.205 g (16.7 mmol) of acrylic acid and 3.482 g (33.4 mmol) of styrene were dissolved in 11.05 g of NMP, and 41 mg (0.25 mmol) of 2,2'-azobis(isobutyronitrile) was added. Then, the mixture was heated and stirred in an inert atmosphere at 70° C. for 6 hours to thereby obtain a solution of a vinyl polymer having a weight-average molecular weight of 13,000.

The obtained vinyl polymer was a random copolymer containing a bonding monomer (acrylic acid) and a non-bonding monomer (styrene) in a proportion of 1:2. Since the molecular weight per constitutional unit of the acrylic acid and the styrene in 1:2 was 280.37, the obtained vinyl polymer contained about 46 bonding monomers (acrylic acid) per molecule.

Synthesis of Intermediate Composition 0.47 g (solid content: 141 mg) of the obtained vinyl polymer solution and 0.11 g of 4,4'-diaminodiphenylmethane were added to 50 g (solid content: 7.5 g) of the obtained polyamideimide solution, and stirred at room temperature for 30 min. Thereafter, the resultant was heated and stirred in an inert atmosphere at 80° C. for 3 hours to thereby obtain an intermediate composition of Example 1 in the state of being an NMP solution.

The molar ratio of the polyamideimide to the vinyl polymer contained in the intermediate composition of Example 1 was 50:1.08 (7.5/15,000:0.141/13,000). Since the number of the bonding monomer per molecule of the vinyl polymer was about 46, in the intermediate composition of Example 1, the molar ratio of the number of the polyamideimide to the number of the bonding monomer contained in the vinyl polymer was 1:1 (50:1.08×46).

Example 2

0.94 g (solid content: 282 mg) of a vinyl polymer solution obtained as in Example 1 and 0.11 g of 4,4'-diaminodiphenylmethane were added to 50 g (solid content: 7.5 g) of a polyamideimide solution obtained as in Example 1, and stirred at room temperature for 30 min. Thereafter, the resultant was heated and stirred in an inert atmosphere at 80° C. for 3 hours to thereby obtain an intermediate composition of Example 2 in the state of being an NMP solution. In the intermediate composition of Example 2, the molar ratio of the number of the polyamideimide to the number of the bonding monomer contained in the vinyl polymer was 1:2.

Example 3

4.7 g (solid content: 1.41 g) of a vinyl polymer solution obtained as in Example 1 and 0.5 g of 4,4'-diaminodiphenylmethane were added to 50 g (solid content: 7.5 g) of a polyamideimide solution obtained as in Example 1, and stirred at room temperature for 30 min. Thereafter, the resultant was heated and stirred in an inert atmosphere at 80° C. for 3 hours to thereby obtain an intermediate composition of Example 3 in the state of being an NMP solution. In the intermediate composition of Example 3, the molar ratio of the number of the polyamideimide to the number of the bonding monomer contained in the vinyl polymer was 1:10.

Comparative Example 1

A polyamideimide solution obtained as in Example 1 was used as Comparative Example 1.
<Fabrication of Silicon Material>
5 g of $CaSi_2$ was added to 20 ml of a concentrated hydrochloric acid in an ice bath at 0° C. containing hydrogen fluoride in a concentration of 1% by mass, and stirred for 1 hour, and thereafter, water was added and stirred further for 5 min. The reaction liquid was filtered and an obtained yellow powder was washed with water and methanol and vacuum dried to thereby obtain a layer polysilane. The obtained layer polysilane was heated in an argon atmosphere at 800° C. to thereby obtain a silicon material made by eliminating hydrogen from the polysilane.
<Fabrication of Electrode Sheets>
80 parts by mass of the silicon material, 10 parts by mass of acetylene black and 10 parts by mass of the NMP solution of the intermediate composition of Example 1 were mixed, and NMP was added to the mixture to thereby prepare a slurry. The slurry was applied in a film form on the surface of an electrolytic copper foil of 30 μm as a current collector by using a doctor blade method. Then, NMP in the slurry was vaporized and removed to thereby form a negative electrode active material layer on the electrolytic copper foil. Then, the electrolytic copper foil and the negative electrode active material layer were compressed by using a roll pressing machine so that the thickness of the negative electrode active material layer became 20 μm to thereby firmly adhere and join the electrolytic copper foil and the negative electrode active material layer. Thereafter, the resultant was subjected to a heat treatment under vacuum (reduced pressure) at 200° C. for 30 min to subject the intermediate composition contained in the negative electrode active material layer to a condensation reaction to heat and cure the negative electrode active material layer. Thereby, there was obtained an electrode sheet containing the specific polymer compound as a negative electrode binder. Further similar electrode sheets were fabricated by using the intermediate compositions of Examples 2 and 3 and the polyamideimide solution of Comparative Example 1 in place of the NMP solution of the intermediate composition of Example 1.
<Fabrication of Lithium Ion Rechargeable Batteries>
A separator was interposed between a negative electrode (evaluation electrode) made by cutting the electrode sheet into a circle of 11 mm in diameter and a positive electrode made by cutting a metallic lithium foil of 500 μm in thickness into a circle of 13 mm in diameter to thereby fabricate an electrode assembly battery. The electrode assembly battery was accommodated in a battery case; then a nonaqueous electrolyte was injected; and the battery case was sealed to thereby obtain a lithium ion rechargeable battery. As the separator, there was used a glass filter, manufactured by Hoechst Celanese Corp. or a Celgard 2400, manufactured by Celgard, LLC. As the nonaqueous electrolyte, there was used a nonaqueous electrolyte in which lithium hexafluorophosphate was dissolved so as to have a concentration of 1 M in a mixed solvent of ethylene carbonate and diethyl carbonate in 1:1 in volume ratio.
<Evaluation of Battery Characteristics>
The obtained lithium ion rechargeable batteries were each discharged at a direct current of 0.2 mA to a voltage of the negative electrode of 0.01 V vs. the positive electrode, and after 10 min from the finish of the discharge, charged at a direct current of 0.2 mA to a voltage of the negative electrode of 1.0 V vs. the positive electrode. The discharge capacity at this time was taken as an initial discharge capacity, and the charge capacity was taken as an initial charge capacity. Then, the initial efficiency was calculated based on the following expression. The results are shown in Table 1.

Initial efficiency (%)=(initial charge capacity/initial discharge capacity)×100

Then, charge and discharge of specified cycles with the above discharge and charge being one cycle was carried out and the cyclability was calculated based on the following expression. The results are shown in Table 1.

Cyclability (%)=(charge capacity after specified cycle/initial charge capacity)×100

TABLE 1

| Test Example | 1 | 2 | 3 | 4 |
|---|---|---|---|---|
| Negative Electrode Active Material | Example 1 | Example 2 | Example 3 | Comparative Example 1 |
| Molar Ratio | 1:1 | 1:2 | 1:10 | 1:0 |
| Initial Discharge Capacity (mAh/g) | 1814 | 1822 | 1819 | 1813 |
| Initial Efficiency (%) | 73.8 | 74.3 | 74.5 | 73.1 |
| Cyclability (%) 50 cycles | 85.3 | 85.5 | 86.1 | 85.4 |

As shown in Table 1, it was confirmed that as compared with Test Example 4, in which the polymer compound of Comparative Example 1 composed of a polyamideimide alone was used as a negative electrode binder, in Test Examples 1 to 3, in which the polymer compounds of Examples 1 to 3 made by condensing a polyamideimide with a vinyl polymer were used as negative electrode binders, the initial efficiency was high. It was confirmed that particularly in Test Example 2 and Test Example 3, in which the molar ratios of the number of a polyamideimide to the number of a bonding monomer contained in a vinyl polymer were 1:2 and 1:10, respectively, the initial efficiency was higher.

The results imply that the number of the bond structures formed between terminals of a polyamideimide and a vinyl polymer affects the effect of improving the initial efficiency. The results also imply that by making the ratio of the number of a bonding monomer contained in the vinyl polymer to the number of the polyamideimide to be 2 or higher, the bond structures are formed between all the terminals of the polyamideimide and the vinyl polymer, and the effect of improving the initial efficiency becomes constant.

Then the cyclabilities of Test Examples 1 to 3, in which the polymer compounds of Examples 1 to 3 made by condensing a polyamideimide with a vinyl polymer were used as negative electrode binders, were evaluated such that they were at levels nearly equal to or higher than a level of Test Example 4, in which the polymer compound of Comparative Example 1 composed of a polyamideimide alone was used as a negative electrode binder. From these results, it is clear that the polymer compounds of Examples 1 to 3 can improve the initial efficiency without impairing the high cyclability, which is characteristic of the polyamideimide, and are useful as negative electrode active materials of rechargeable batteries.

Example 4

Synthesis of Vinyl Polymer 0.621 g (8.6 mmol) of acrylic acid and 4.00 g (34.4 mmol) of hydroxyethyl acrylate were dissolved in 18.5 g of NMP, and 41 mg (0.25 mmol) of 2,2'-azobis(isobutyronitrile) was added. Then, the mixture was heated and stirred in an inert atmosphere at 70° C. for 6 hours to thereby obtain a solution of a vinyl polymer having a weight-average molecular weight of 13,000.

The obtained vinyl polymer was a random copolymer containing a bonding monomer (acrylic acid) and a non-bonding monomer (hydroxyethyl acrylate) in a proportion of 1:4. Since the molecular weight per constitutional unit of the acrylic acid and the hydroxyethyl acrylate in 1:4 was 537.08, the obtained vinyl polymer contained about 24 bonding monomers (acrylic acid) per molecule.

Synthesis of Intermediate Composition 1.64 g (solid content: 328 mg) of the above vinyl polymer solution and 0.060 g of 4,4'-diaminodiphenylmethane were added to 34.1 g (solid content: 4.5 g) of a polyamideimide solution obtained as in Example 1, and stirred at room temperature for 30 min. Thereafter, the resultant was heated and stirred in an inert atmosphere at 80° C. for 3 hours to thereby obtain an intermediate composition of Example 4 in the state of being an NMP solution. In the intermediate composition of Example 4, the molar ratio of the number of the polyamideimide to the number of the bonding monomer contained in the vinyl polymer was 1:2.

Example 5

Synthesis of Vinyl Polymer 0.621 g (8.6 mmol) of acrylic acid and 5.30 g (34.4 mmol) of N-[3-(dimethylamino)propyl]acrylamide were dissolved in 24.0 g of NMP, and 41 mg (0.25 mmol) of 2,2'-azobis(isobutyronitrile) was added. Then, the mixture was heated and stirred in an inert atmosphere at 70° C. for 6 hours to thereby obtain a solution of a vinyl polymer having a weight-average molecular weight of 13,000.

The obtained vinyl polymer was a random copolymer containing a bonding monomer (acrylic acid) and a non-bonding monomer (N-[3-(dimethylamino)propyl]acrylamide) in a proportion of 1:4. Since the molecular weight per constitutional unit of the acrylic acid and the N-[3-(dimethylamino)propyl]acrylamide in 1:4 was 696.98, the obtained vinyl polymer contained about 19 bonding monomers (acrylic acid) per molecule.

Synthesis of Intermediate Composition 2.06 g (solid content: 412 mg) of the above vinyl polymer solution and 0.060 g of 4,4'-diaminodiphenylmethane were added to 34.1 g (solid content: 4.5 g) of a polyamideimide solution obtained as in Example 1, and stirred at room temperature for 30 min. Thereafter, the resultant was heated and stirred in an inert atmosphere at 80° C. for 3 hours to thereby obtain an intermediate composition of Example 5 in the state of being an NMP solution. In the intermediate composition of Example 5, the molar ratio of the number of the polyamideimide to the number of the bonding monomer contained in the vinyl polymer was 1:2.

Example 6

Synthesis of Vinyl Polymer 0.621 g (8.6 mmol) of acrylic acid and 3.90 g (34.4 mmol) of N-isopropylacrylamide were dissolved in 18.1 g of NMP, and 41 mg (0.25 mmol) of 2,2'-azobis(isobutyronitrile) was added. Then, the mixture was heated and stirred in an inert atmosphere at 70° C. for 6 hours to thereby obtain a solution of a vinyl polymer having a weight-average molecular weight of 13,000.

The obtained vinyl polymer was a random copolymer containing a bonding monomer (acrylic acid) and a non-bonding monomer (N-isopropylacrylamide) in a proportion of 1:4. Since the molecular weight per constitutional unit of the acrylic acid and the N-isopropylacrylamide in 1:4 was 524.7, the obtained vinyl polymer contained about 25 bonding monomers (acrylic acid) per molecule.

Synthesis of Intermediate Composition 1.57 g (solid content: 314 mg) of the above vinyl polymer solution and 0.060 g of 4,4'-diaminodiphenylmethane were added to 34.1 g (solid content: 4.5 g) of a polyamideimide solution obtained as in Example 1, and stirred at room temperature for 30 min. Thereafter, the resultant was heated and stirred in an inert atmosphere at 80° C. for 3 hours to thereby obtain an intermediate composition of Example 6 in the state of being an NMP solution. In the intermediate composition of Example 6, the molar ratio of the number of the polyamideimide to the number of the bonding monomer contained in the vinyl polymer was 1:2.

<Fabrication of Electrode Sheets and Lithium Ion Rechargeable Batteries>

Electrode sheets and lithium ion rechargeable batteries were fabricated as in the above by using the NMP solutions of the intermediate compositions of Examples 4 to 6.

<Evaluation of Battery Characteristics>

For the obtained lithium ion rechargeable batteries, the initial discharge capacity, the initial efficiency and the cyclability were determined by the same method as in the above. The results are shown in Table 2.

TABLE 2

| Test Example | 5 | 6 | 7 | 4 |
|---|---|---|---|---|
| Negative Electrode Active Material | Example 4 | Example 5 | Example 6 | Comparative Example 1 |
| Initial Discharge Capacity (mAh/g) | 1834 | 1844 | 1810 | 1813 |
| Initial Efficiency (%) | 75.1 | 74.7 | 74.2 | 73.1 |
| Cyclability (%) 50 cycles | 85.4 | 85.5 | 85.7 | 85.4 |

As shown in Table 2, it was confirmed that as compared with Test Example 4, in which the polymer compound of Comparative Example 1 composed of a polyamideimide alone was used as a negative electrode binder, in Test Examples 5 to 7, in which the polymer compounds of Examples 4 to 6 made by condensing a polyamideimide with a vinyl polymer were used as negative electrode binders, the initial efficiency was high.

Then the cyclabilities of Test Examples 5 to 7, in which the polymer compounds of Examples 4 to 6 made by condensing a polyamideimide with a vinyl polymer were used as negative electrode binders, were evaluated such that they were at levels nearly equal to a level of Test Example 4, in which the polymer compound of Comparative Example 1 composed of a polyamideimide alone was used as a negative electrode binder. From these results, it is clear that the polymer compounds of Examples 4 to 6 can improve the initial efficiency without impairing the high cyclability, which is characteristic of the polyamideimide, and are useful as negative electrode active materials of rechargeable batteries.

Example 7

0.56 g (solid content: 168 mg) of a vinyl polymer solution obtained as in Example 1 and 0.60 g of 4,4'-diaminodiphenylmethane were added to 34.1 g (solid content: 4.5 g) of a polyamideimide solution obtained as in Example 1, and stirred at room temperature for 30 min. Thereafter, the resultant was heated and stirred in an inert atmosphere at 80° C. for 3 hours, and cooled to room temperature. Thereafter, 74.2 mg (0.30 mmol) of 3-(triethoxysilyl)propyl isocyanate was added, and stirred at room temperature for 3 hours to thereby obtain an intermediate composition of Example 7 in the state of being an NMP solution. In the intermediate composition of Example 7, the molar ratio of the number of the polyamideimide to the number of the bonding monomer contained in the vinyl polymer was 1:2.

Example 8

0.56 g (solid content: 168 mg) of a vinyl polymer solution obtained as in Example 1 and 0.60 g of 4,4'-diaminodiphenylmethane were added to 34.1 g (solid content: 4.5 g) of a polyamideimide solution obtained as in Example 1, and stirred at room temperature for 30 min. Thereafter, the resultant was heated and stirred in an inert atmosphere at 80° C. for 3 hours, and cooled to room temperature. Thereafter, 371.2 mg (1.5 mmol) of 3-(triethoxysilyl)propyl isocyanate was added, and stirred at room temperature for 3 hours to thereby obtain an intermediate composition of Example 8 in the state of being an NMP solution. In the intermediate composition of Example 8, the molar ratio of the number of the polyamideimide to the number of the bonding monomer contained in the vinyl polymer was 1:2.

<Fabrication of Electrode Sheets and Lithium Ion Rechargeable Batteries>

Electrode sheets and lithium ion rechargeable batteries were fabricated as in the above by using the NMP solutions of the intermediate compositions of Examples 7 and 8.

<Evaluation of Battery Characteristics>

For the obtained lithium ion rechargeable batteries, the initial discharge capacity, the initial efficiency and the cyclability were determined by the same method as in the above. The results are shown in Table 3.

<Evaluation of Adhesiveness>

The obtained electrode sheets were cut into 2.5 cm×4 cm, which were used as measuring samples; and the measuring samples were subjected to a 90° peel test according to JIS K6854-1 by using a peel tester (manufactured by MINEBEA Co., Ltd., LTS-50N-S300). The peel strength of the measuring sample was calculated by dividing a strength measured by the 90° peel test by the width (2.5 cm). The same test was carried out by using the electrode sheets fabricated by using the intermediate compositions of Example 2 and Comparative Example 1. These results are shown in table 3.

TABLE 3

| Test Example | 8 | 9 | 2 | 4 |
|---|---|---|---|---|
| Negative Electrode Active Material | Example 7 | Example 8 | Example 2 | Comparative Example 1 |
| Initial Discharge Capacity (mAh/g) | 1834 | 1844 | 1822 | 1813 |
| Initial Efficiency (%) | 74.3 | 73.4 | 74.3 | 73.1 |
| Cyclability (%) 50 cycles | 87.8 | 88.5 | 85.5 | 85.4 |
| Peel Strength (N/cm) | 0.568 | 0.655 | 0.548 | 0.546 |

As shown in Table 3, it was confirmed that as compared with Test Example 4, in which the polymer compound of Comparative Example 1 composed of a polyamideimide alone was used as a negative electrode binder, in Test Examples 8 and 9, in which the polymer compounds of Examples 7 and 8 made by condensing a silane-modified polyamideimide with a vinyl polymer were used as negative electrode binders, the initial efficiency was high.

Then, the cyclability and the peel strength of Test Example 2, in which the polymer compound of Example 2 made by condensing a polyamideimide with a vinyl polymer was used as a negative electrode binder, were at levels nearly equal to levels of Test Example 4, in which the polymer compound of Comparative Example 1 composed of a polyamideimide alone was used as a negative electrode binder. On the other hand, the cyclabilities and the peel strengths of Test Examples 8 and 9, in which the polymer compounds of Examples 7 and 8 made by condensing a silane-modified polyamideimide with a vinyl polymer were used as negative electrode binders, were higher than those of Test Example 4, in which the polymer compound of Comparative Example 1 composed of a polyamideimide alone was used as a negative electrode binder. From the results of Test Example 8 and Test Example 9, it was confirmed that as the degree of modification of a silane-modified polyamideimide became high, the effect of improving the initial efficiency was likely to become small and the improving effects of the cyclability and the peel strength were likely to become large.

The invention claimed is:
1. A polymer compound for use as a negative electrode binder of an electricity storage device, the polymer compound being characterized by:
a first chain structure constituted by a polyamideimide; and
a second chain structure constituted by a vinyl polymer and bonded to terminals of the first chain structures and connecting the first chain structures together, wherein
the vinyl polymer constituting the second chain structure is a random copolymer comprising
a bond-constituting unit having a side chain to be bonded to the first chain structure, and
a non-bond-constituting unit having no side chain to be bonded to the first chain structure,
the first chain structure and the second chain structure are bonded together through at least one of an amide bond and an imide bond, and
a bond structure between the first chain structure and the second chain structure is a bond structure represented by the following general formula (1):

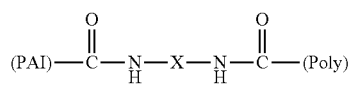

(1)

where PAI is the first chain structure; Poly is the second chain structure; and X is a structure represented by the following general formula (2):

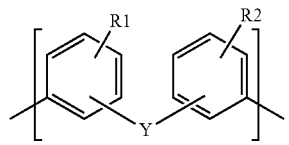

(2)

where Y is a straight-chain alkyl group having 1 to 4 carbon atoms, a phenylene group, or an oxygen atom; and R1 and R2 are each independently a hydrogen atom, a methyl group, a trifluoromethyl group, or a methoxy group.

2. A polymer compound for use as a negative electrode binder of an electricity storage device, characterized in that
the polymer compound is made by condensing a polyamideimide, a vinyl polymer, and a polyfunctional amine,
the vinyl polymer is a random copolymer comprising, as constitutional units,
a vinyl monomer having a side chain capable of forming an amide bond or an imide bond between the vinyl polymer and an amino group or a carboxyl group, and
a vinyl monomer forming no amide bond nor imide bond between the vinyl polymer and an amino group or a carboxyl group, and
the polyfunctional amine is an aromatic polyfunctional amine represented by the following general formula (3):

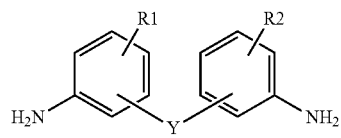

(3)

where Y is a straight-chain alkyl group having 1 to 4 carbon atoms, a phenylene group, or an oxygen atom; and R1 and R2 are each independently a hydrogen atom, a methyl group, a trifluoromethyl group, or a methoxy group.

3. An intermediate composition of a polymer compound for use as a negative electrode binder of an electricity storage device, the intermediate composition being characterized by:
a polyamideimide;
a vinyl polymer; and
a polyfunctional amine, wherein
the vinyl polymer is a random copolymer comprising, as constitutional units,
a vinyl monomer having a side chain capable of forming an amide bond or an imide bond between the vinyl polymer and an amino group or a carboxyl group, and
a vinyl monomer forming no amide bond nor imide bond between the vinyl polymer and an amino group or a carboxyl group, and
the polyfunctional amine is an aromatic polyfunctional amine represented by the following general formula (3):

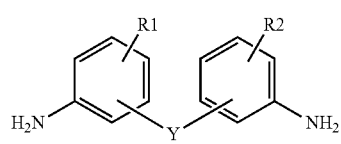

(3)

where Y is a straight-chain alkyl group having 1 to 4 carbon atoms, a phenylene group, or an oxygen atom; and R1 and R2 are each independently a hydrogen atom, a methyl group, a trifluoromethyl group, or a methoxy group.

4. A method for producing a polymer compound for use as a negative electrode binder of an electricity storage device, the method comprising condensing a polyamideimide, a vinyl polymer, and a polyfunctional amine, wherein
the vinyl polymer is a random copolymer comprising, as constitutional units,
a vinyl monomer having a side chain capable of forming an amide bond or an imide bond between the vinyl polymer and an amino group or a carboxyl group, and
a vinyl monomer forming no amide bond nor imide bond between the vinyl polymer and an amino group or a carboxyl group, and
the polyfunctional amine is an aromatic polyfunctional amine represented by the following general formula (3):

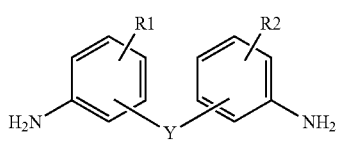

(3)

where Y is a straight-chain alkyl group having 1 to 4 carbon atoms, a phenylene group, or an oxygen atom; and R1 and R2 are each independently a hydrogen atom, a methyl group, a trifluoromethyl group, or a methoxy group.

5. A negative electrode of an electricity storage device, comprising:
   a binder comprising a polymer compound; and
   a negative electrode active material,
   wherein the negative electrode active material is at least one selected from carbon-based materials capable of occluding and releasing lithium, elements alloyable with lithium, and compounds having an element alloyable with lithium,
   the polymer compound is made by condensing a polyamideimide, a vinyl polymer, and an aromatic polyfunctional amine,
   the polyamideimide includes a terminal provided with a carboxyl group,
   the aromatic polyfunctional amine is represented by following general formula (3),
   the polymer compound includes:
      a first chain structure constituted by the polyamideimide; and
      a second chain structure constituted by the vinyl polymer and bonded to terminals of the first chain structures and connecting the first chain structures together,
   the vinyl polymer is a random copolymer comprising, as constitutional units,
      a bonding monomer, which is a vinyl monomer having a side chain capable of forming an amide bond or an imide bond between the vinyl polymer and an amino group or a carboxyl group, and
      a non-bonding monomer, which is a vinyl monomer forming no amide bond nor imide bond between the vinyl polymer and an amino group or a carboxyl group,
   the vinyl monomer having the side chain includes a carboxyl group as the side chain,
   the ratio of the bonding monomer and the non-bonding monomer in the vinyl polymer (the bonding monomer: the non-bonding monomer) is in the range of 1:1 to 1:10,
   the mole ratio of the number of bonding monomers contained in the vinyl polymer to the number of carboxyl groups of terminals of the polyamideimide (the number of bonding monomers/the number of carboxyl groups of polyamideimide) is greater than 1,
   the molar ratio of the number of bonding monomers contained in the vinyl polymer to the number of the polyamideimide (the number of bonding monomers/the number of the polyamideimide) is less than or equal to 10,
   a bond structure containing at least one of an amide bond and an imide bond between carboxyl group of the terminals of the first chain structures and carboxyl group of the side chain of the bonding monomers in the second chain structure,
   the amide bond is represented by the following general formula (1),
   the imide bond is made by bonding carboxyl groups of terminals of the polyamideimide to nitrogen atom in the following general formula (1),
   the second chain structure has a carboxyl group, which is not bonded to the terminals of the first chain structures and is capped by the aromatic polyfunctional amine represented by following general formula (3), as the side chain of the bonding monomers,
   in the following general formulas (1) to (3), PAI is the first chain structure; Poly is the second chain structure; and X is a structure represented by the following general formula (2), Y is a straight-chain alkyl group having 1 to 4 carbon atoms, a phenylene group, or an oxygen atom, and R1 and R2 are each independently a hydrogen atom, a methyl group, a trifluoromethyl group, or a methoxy group.

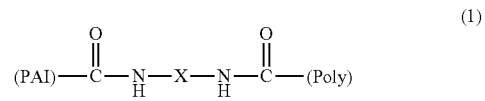

(1)

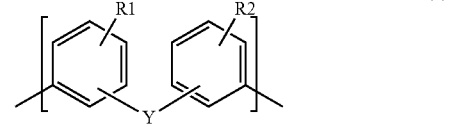

(2)

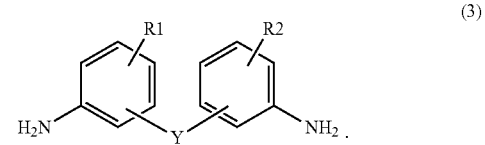

(3)

6. The negative electrode according to claim 5, wherein the negative electrode active material is at least one selected from silicon materials obtained from $CaSi_2$ through a calcium removal reaction, Si and $SiO_V$ (0<V≤2).

7. An electricity storage device, comprising a negative electrode according to claim 5, and a nonaqueous electrolyte.

8. A method for producing a negative electrode of an electricity storage device, comprising:
   forming a negative electrode active material layer on a current collector using a mixture of an intermediate composition and a negative electrode active material; and
   subjecting the negative electrode active material layer to a heat treatment to thereby condense the polyamideimide, the vinyl polymer, and the polyfunctional amine,
   wherein
   the intermediate composition contains a polyamideimide, a vinyl polymer, and an aromatic polyfunctional amine,
   the polyamideimide includes a terminal provided with a carboxyl group,
   the aromatic polyfunctional amine is represented by following general formula (3),
   the vinyl polymer is a random copolymer comprising, as constitutional units,
      a bonding monomer, which is a vinyl monomer having a side chain capable of forming an amide bond or an imide bond between the vinyl polymer and an amino group or a carboxyl group, and a non-bonding monomer, which is a vinyl monomer forming no amide bond nor imide bond between the vinyl polymer and an amino group or a carboxyl group, the vinyl monomer having the side chain includes a carboxyl group as the side chain, the ratio of the bonding monomer and the non-bonding monomer in the vinyl polymer (the bonding monomer: the non-bonding monomer) is in the range of 1:1 to 1:10, the mole ratio of the number of bonding monomers contained in the vinyl polymer to the number of carboxyl groups of terminals of the polyamideimide (the number of bonding monomers/the number of carboxyl groups of polyamideimide) is greater than 1, the molar ratio of the number of bonding monomers contained in the vinyl polymer to the number of the polyamideimide (the number of bonding monomers/the number of the polyamideimide) is less than or equal to 10, the blend proportion of the aromatic polyfunctional amine is set such that the number of the aromatic polyfunctional amine is greater than or equal to the number of carboxyl groups of terminals of the polyamideimide, and in the following general formula (3),

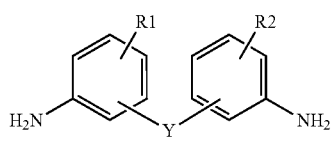

(3)

Y is a straight-chain alkyl group having 1 to 4 carbon atoms, a phenylene group, or an oxygen atom; and R1 and R2 are each independently a hydrogen atom, a methyl group, a trifluoromethyl group, or a methoxy group.

9. The negative electrode according to claim 5, wherein the polyamideimide is a silane-modified polyamideimide containing an alkoxysilyl group.

10. The negative electrode according to claim 5, wherein the silane-modified polyamideimides is represented by the general formula (7),

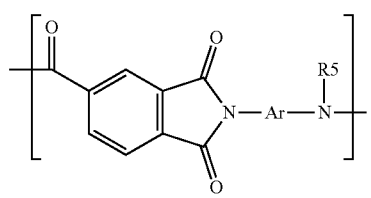

(7)

in the general formula (7), Ar is a structure represented by the general formula (5) or the general formula (6); and R5 is a functional group containing an alkoxysilyl group,

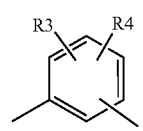

(5)

in the general formula (5), R3 and R4 are each independently a single or a plurality of hydrogen atoms, a methyl group or an ethyl group,

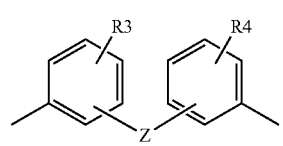

(6)

in the general formula (6), R3 and R4 are each independently a single or a plurality of hydrogen atoms, a methyl group or an ethyl group, Z is a structure represented by —O—, —S—, —C(=O)—, —SO$_2$—, —C(=O)O—, —C(CF$_3$)$_2$— or —C(CH$_3$)$_2$—, and the letter n of —(CH$_2$)$_n$— is an integer of 0 or more and 5 or less.

11. The method according to claim 8, wherein the polyamideimide is a silane-modified polyamideimide containing an alkoxysilyl group.

12. The method according to claim 8, wherein the silane-modified polyamideimides is represented by the general formula (7),

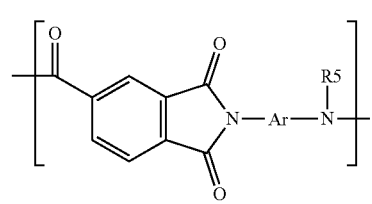

(7)

in the general formula (7), Ar is a structure represented by the general formula (5) or the general formula (6); and R5 is a functional group containing an alkoxysilyl group,

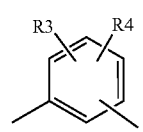

(5)

in the general formula (5), R3 and R4 are each independently a single or a plurality of hydrogen atoms, a methyl group or an ethyl group,

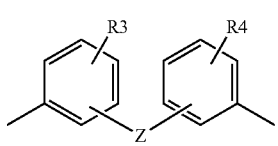 (6)
in the general formula (6), R3 and R4 are each independently a single or a plurality of hydrogen atoms, a methyl group or an ethyl group,
Z is a structure represented by —O—, —S—, —C(=O)—, —SO$_2$—, —C(=O)O—, —C(CF$_3$)$_2$— or —C(CH$_3$)$_2$—, and
the letter n of —(CH$_2$)$_n$— is an integer of 0 or more and 5 or less.
\* \* \* \* \*